United States Patent
Zheng et al.

(10) Patent No.: US 12,429,345 B2
(45) Date of Patent: Sep. 30, 2025

(54) UNMANNED VEHICLE PATH OPTIMIZATION METHOD AND RELATED DEVICE

(71) Applicant: JINGDONG KUNPENG (JIANGSU) TECHNOLOGY CO., LTD., Jiangsu (CN)

(72) Inventors: Jie Zheng, Jiangsu (CN); Liangliang Zhang, Jiangsu (CN)

(73) Assignee: Jingdong Kunpeng (Jiangsu) Technology Co., Ltd., Changshu (CN)

( * ) Notice: Subject to any disclaimer, the term of this patent is extended or adjusted under 35 U.S.C. 154(b) by 40 days.

(21) Appl. No.: 18/257,106

(22) PCT Filed: Dec. 22, 2021

(86) PCT No.: PCT/CN2021/140373
§ 371 (c)(1),
(2) Date: Jun. 13, 2023

(87) PCT Pub. No.: WO2022/179277
PCT Pub. Date: Sep. 1, 2022

(65) Prior Publication Data
US 2024/0110802 A1    Apr. 4, 2024

(30) Foreign Application Priority Data
Feb. 25, 2021  (CN) .......................... 202110212133.5

(51) Int. Cl.
*G01C 21/00* (2006.01)
*B60W 60/00* (2020.01)
*G01C 21/34* (2006.01)

(52) U.S. Cl.
CPC ....... *G01C 21/3461* (2013.01); *B60W 60/001* (2020.02)

(58) Field of Classification Search
CPC .......................... G01C 21/3461; B60W 60/001
See application file for complete search history.

(56) References Cited

U.S. PATENT DOCUMENTS

2018/0100743 A1    4/2018  Diaz et al.
2020/0089239 A1*   3/2020  Navarro ................. G06Q 50/40

FOREIGN PATENT DOCUMENTS

CN     109900289 A     6/2019
CN     109947123 A     6/2019
(Continued)

OTHER PUBLICATIONS

International Search Report dated Mar. 25, 2022 of International Application No. PCT/CN2021/140373.
(Continued)

*Primary Examiner* — Vivek D Koppikar
*Assistant Examiner* — Jeffrey R Chalhoub
(74) *Attorney, Agent, or Firm* — Qinghong Xu (57) ABSTRACT

An unmanned vehicle path optimization method and apparatus, a computer readable storage medium, and an electronic device, relating to the technical field of computers and communications. The method comprises: obtaining a generated initial path of an unmanned vehicle; obtaining an obstacle in the periphery of the initial path; if the unmanned vehicle intersects with the obstacle on the initial path, deciding not to detour the obstacle; if a second waypoint is located on the left side of a line connecting a first waypoint and a central point of the obstacle, deciding to detour the obstacle leftwards; if the second waypoint is located on the right side of the line connecting the first waypoint and the central point of the obstacle, deciding to detour the obstacle rightwards; and optimizing the initial path of the unmanned vehicle on the basis of the decision for the obstacle.

20 Claims, 6 Drawing Sheets

(56) References Cited

FOREIGN PATENT DOCUMENTS

| | | | | |
|---|---|---|---|---|
| CN | 110749333 | A | | 2/2020 |
| CN | 110766220 | A | | 2/2020 |
| CN | 111060103 | A | | 4/2020 |
| CN | 111158359 | A | | 5/2020 |
| CN | 111413968 | A | | 7/2020 |
| CN | 112148003 | A | | 12/2020 |
| CN | 112270460 | A | | 1/2021 |
| CN | 112363511 | A | | 2/2021 |
| CN | 109947123 | B | * | 6/2021 |
| CN | 113804208 | A | | 12/2021 |
| CN | 113805578 | A | | 12/2021 |
| CN | 110749333 | B | * | 2/2022 ......... G01C 21/3446 |
| FR | 3096637 | A1 | | 12/2020 |
| WO | 2020040773 | A1 | | 2/2020 |
| WO | 2022179277 | A1 | | 9/2022 |

OTHER PUBLICATIONS

Extended European Search Report dated Apr. 18, 2024 for European Application No. 21927701.9.
1st Office Action dated Dec. 29, 2023 for Chinese Application No. 202110212133.5.

* cited by examiner

UNMANNED VEHICLE PATH OPTIMIZATION METHOD AND RELATED DEVICE

CROSS REFERENCE

The present application is a U.S. National Stage of International Application No. PCT/CN2021/140373, filed on Dec. 22, 2021, which claims benefit of priority to Chinese Application No. 202110212133.5, filed on Feb. 25, 2021, both of which are incorporated herein by reference in their entireties for all purposes.

TECHNICAL FIELD

The present disclosure relates to the field of computer and communication technologies, and in particular, to a method and device for optimizing a path of an unmanned vehicle, a computer-readable storage medium, and an electronic device.

BACKGROUND

The current mobile robot technology is developing rapidly. With the continuous expansion of robot application scenarios and modes in recent years, all kinds of mobile robots emerge in an endless stream, and unmanned vehicles are one of them. At present, the path planning of unmanned vehicles is generally based on the evaluation system to obtain an optimal path in the evaluation system, and then use the path directly for speed planning, without giving specific lateral decisions for obstacles around the path (i.e. detouring leftward, detouring rightward or not detouring).

SUMMARY

According to one aspect of the present disclosure, a method for optimizing a path of an unmanned vehicle is provided, including: acquiring an initial path generated by the unmanned vehicle, wherein the initial path includes a plurality of discrete waypoints; acquiring an obstacle around the initial path; if the unmanned vehicle intersects the obstacle on the initial path, deciding not to detour the obstacle; if the unmanned vehicle does not intersect the obstacle on the initial path, then: among discrete waypoints in the initial path, if there are two adjacent first waypoint and second waypoint close to the obstacle, and the second waypoint is located on a left side of a line connecting the first waypoint and a center point of the obstacle, deciding to detour the obstacle leftwards; among the discrete waypoints in the initial path, if there are two adjacent first and second waypoints close to the obstacle, and the second waypoint is located on a right side of a line connecting the first waypoint and the center point of the obstacle, deciding to detour the obstacle rightwards; and optimizing the initial path of the unmanned vehicle based on the deciding for the obstacle.

In one embodiment, the unmanned vehicle has a center point, and the initial path is a movement trajectory of the center point of the unmanned vehicle during a driving process of the unmanned vehicle, wherein said the unmanned vehicle intersects the obstacle on the initial path, includes: when the center point of the unmanned vehicle coincides with one discrete waypoint among the plurality of discrete waypoints, the unmanned vehicle intersects the obstacle.

In one embodiment, the unmanned vehicle has a center point, and the initial path is a movement trajectory of the center point of the unmanned vehicle during a driving process of the unmanned vehicle, wherein the unmanned vehicle intersects the obstacle on the initial path includes: when the center point of the unmanned vehicle is between two adjacent discrete waypoints of the initial path, the unmanned vehicle intersects the obstacle.

In one embodiment, the center point of the unmanned vehicle is between two adjacent discrete waypoints of the initial path, includes: there are a plurality of intermediate trajectory points of the center points of the unmanned vehicles inserted according to the movement trajectory of the unmanned vehicle between the two adjacent discrete waypoints of the initial path, and the center point of the unmanned vehicle moves along the intermediate trajectory points between the two adjacent discrete waypoints.

In one embodiment, the obstacle includes an obstacle boundary polygon, the obstacle boundary polygon includes a starting Frenet S coordinate and an ending Frenet S coordinate, the starting Frenet S coordinate of the obstacle boundary polygon is a minimum value of the Frenet S coordinates of endpoint coordinates of the obstacle boundary polygon, and the ending Frenet S coordinate of the obstacle boundary polygon is a maximum value of the Frenet S coordinates of the endpoint coordinates of the obstacle boundary polygon, wherein, said if there are two adjacent first waypoint and second waypoint close to the obstacle, includes: if the Frenet S coordinate of the second waypoint is greater than the starting Frenet S coordinate of the obstacle and the Frenet S coordinate of the first waypoint is smaller than the ending Frenet S coordinate of the obstacle, there are two adjacent first waypoint and second waypoint close to the obstacle.

In one embodiment, the obstacle includes an obstacle boundary polygon, wherein said if the unmanned vehicle intersects the obstacle on the initial path, includes: if the unmanned vehicle intersects the obstacle or the obstacle boundary polygon on the initial path.

In one embodiment, said if the unmanned vehicle intersects the obstacle or the obstacle boundary polygon on the initial path, includes: among discrete waypoints in the initial path, if there is one discrete waypoint, and the unmanned vehicle intersects the obstacle or the obstacle boundary polygon.

According to one aspect of the present disclosure, an apparatus for optimizing a path of an unmanned vehicle is provided, including: an acquisition module, configured to acquire an initial path generated by the unmanned vehicle, and acquire obstacle information around the initial path, wherein the initial path includes a plurality of discrete waypoints; a determination module, configured to decide not to detour the obstacle if the unmanned vehicle intersects the obstacle on the initial path; if the unmanned vehicle does not intersect the obstacle on the initial path, then: among discrete waypoints in the initial path, if there are two adjacent first waypoint and second waypoint close to the obstacle, and the second waypoint is located on a left side of a line connecting the first waypoint and a center point of the obstacle, decide to detour the obstacle leftwards; among the discrete waypoints in the initial path, if there are two adjacent first waypoint and second waypoint close to the obstacle, and the second waypoint is located on a right side of a line connecting the first waypoint and the center point of the obstacle, decide to detour the obstacle rightwards; and an optimization module configured to optimize the initial path of the unmanned vehicle based on a decision of the obstacle.

According to one aspect of the present disclosure, there is provided an electronic device, comprising: one or more processors; a memory configured to store one or more programs that, when executed by the one or more processors, cause the one or more processors to implement any of the method described in the above embodiments.

According to one aspect of the present disclosure, there is provided a computer-readable storage medium, where a computer program is stored in the computer-readable storage medium, wherein any of the method described in the above embodiments is implemented when the computer program is executed by a processor.

It is to be understood that the foregoing general description and the following detailed description are exemplary and explanatory only and are not restrictive of the present disclosure.

BRIEF DESCRIPTION OF THE DRAWINGS

The following figures describe certain illustrative embodiments of the present disclosure, wherein like reference numerals refer to like elements. These described embodiments are intended to be exemplary embodiments of the present disclosure and are not intended to be limiting in any way.

DETAILED DESCRIPTION

Exemplary embodiments will now be described more fully with reference to the accompanying drawings. Exemplary embodiments, however, can be embodied in various forms and should not be construed as limited to the examples set forth herein; rather, these embodiments are provided so that this disclosure will be thorough and complete, and will fully convey the concept of example embodiments to those skilled in the art.

Furthermore, the described features, structures, or characteristics may be combined in any suitable manner in one or more embodiments. In the following description, numerous specific details are provided in order to give a thorough understanding of the embodiments of the present disclosure. However, those skilled in the art will appreciate that the technical solutions of the present disclosure may be practiced without one or more of the specific details, or other methods, components, devices, steps, etc. may be employed. In other instances, well-known methods, devices, implementations, or operations have not been shown or described in detail to avoid obscuring aspects of the present disclosure.

The block diagrams shown in the figures are merely functional entities and do not necessarily correspond to physically separate entities. That is, these functional entities may be implemented in software, or in one or more hardware modules or integrated circuits, or in different networks and/or processor devices and/or microcontroller devices.

The flowcharts shown in the figures are only exemplary illustrations and do not necessarily include all contents and operations/steps, nor do they have to be performed in the order described. For example, some operations/steps can be decomposed, and some operations/steps can be combined or partially combined, so the actual execution order may be changed according to the actual situation.

If the optimal path obtained based on the set evaluation system is not smooth enough, subsequent smoothing processing is required. Since there is no lateral decision for obstacles around the path, the path after smoothing may have inconsistent detour behavior toward obstacles compared with the path before smoothing, which will cause the unmanned vehicle to be unable to detour obstacles.

In the technical solutions according to some embodiments of the present disclosure, a decision-making method for obstacle around the initial path is obtained according to the initial path generated by the unmanned vehicle, which can avoid the problem of not being able to detour the obstacle caused by inconsistent detour behaviors for the obstacle. The path after smoothing the initial path may have inconsistent detour behavior for the obstacle compared to the path before smoothing.

Figure 1:
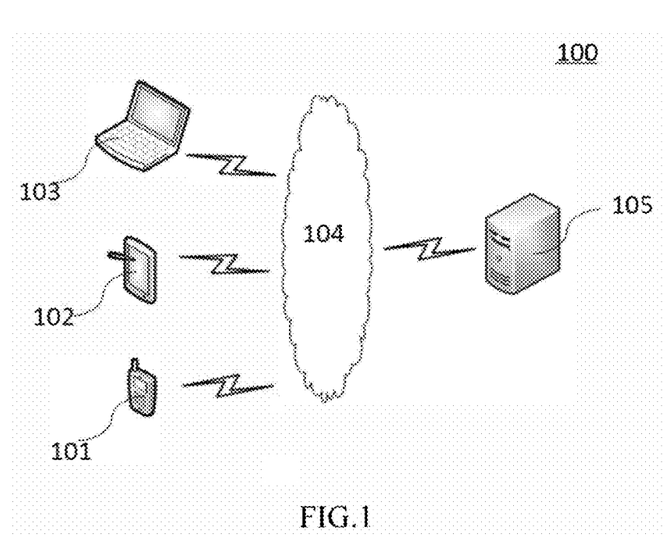
FIG. 1 shows a schematic diagram of an exemplary system architecture of method or device for optimizing a path of an unmanned vehicle to which one or more embodiments of the present disclosure can be applied.

FIG. 1 shows a schematic diagram of an exemplary system architecture 100 to which method or apparatus for optimizing a path of an unmanned vehicle according to one or more embodiments of the present disclosure may be applied.

As shown in FIG. 1, the system architecture 100 may include one or more of terminal devices 101, 102, and 103, a network 104 and a server 105. The network 104 is the medium used to provide the communication link between the terminal devices 101, 102, 103 and the server 105. The network 104 may include various connection types, such as wired, wireless communication links, or fiber optic cables, among others.

It should be understood that the numbers of terminal devices, networks and servers in FIG. 1 are merely illustrative. There can be any number of terminal devices, networks and servers according to implementation needs. For example, the server 105 may be a server cluster composed of a plurality of servers, or the like.

The unmanned vehicle can use the terminal devices 101, 102, 103 to interact with the server 105 through the network 104 to receive or send messages and the like. The terminal devices 101, 102, 103 may be various electronic devices with display screens, including but not limited to smart phones, tablet computers, portable and desktop computers, digital movie projectors, and the like.

The server 105 may be a server that provides various services. For example, the unmanned vehicle sends a request for optimizing a path of an unmanned vehicle to the server 105 by using the terminal device 103 (which may also be the terminal device 101 or 102). The server 105 can obtain an obstacle around an initial path by obtaining the initial path generated by the unmanned vehicle, wherein the initial path includes a plurality of discrete waypoints. If the unmanned vehicle intersects an obstacle on the initial path, the decision for the obstacle is not to detour. If the unmanned vehicle does not intersect the obstacle on the initial path, then: the decision for the obstacle is to detour leftward, if there are two adjacent first waypoint and second waypoint close to the obstacle in the discrete waypoints in the initial path, and the second waypoint is located on left side of a line connecting the first waypoint and the center point of the obstacle; and the decision on the obstacle is to detour rightwards, if there are two adjacent first waypoint and second waypoint close to the obstacle in the discrete waypoints in the initial path, and the the second waypoint is located on right side of a line connecting the first waypoint and the center point of the obstacle. The initial path of the unmanned vehicle is optimized based on the decision for the obstacle. The server 105 can send the optimized path information to the terminal device 103 to display the optimized path information on the terminal device 103, so that the unmanned vehicle can view the corresponding current optimized path of the unmanned vehicle based on the content displayed on the terminal device 103.

For another example, the terminal device 103 (which may also be the terminal device 101 or 102) may be a smart TV, a VR (Virtual Reality)/AR (Augmented Reality) head-mounted display, or a mobile terminal with navigation or online car-hailing, instant messaging, video applications (APPs) or the like installed thereon. For example, the mobile terminal may be a smart phone, tablet computer or the like. The unmanned vehicle can send the request for optimizing the path of the unmanned vehicle to the server 105 by the smart TV, VR/AR helmet display or the navigation, online car-hailing, instant messaging, video APPs. The server 105 can obtain a result of the path optimization of the unmanned vehicle based on the request, and return the result to the smart TV, VR/AR helmet display or the navigation, car-hailing, instant messaging, video APP, and then the returned result is displayed through the smart TV, VR/AR helmet display, or the navigation, online car-hailing, instant messaging, and video APPs.

Figure 2:
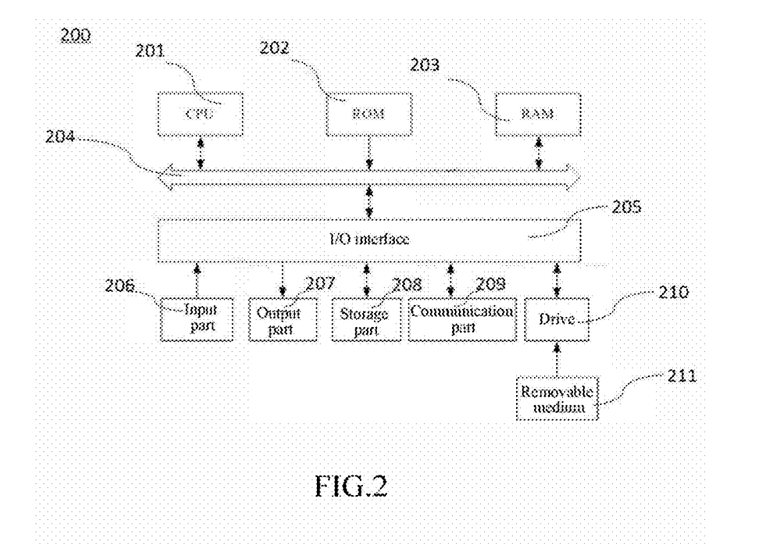
FIG. 2 shows a schematic structural diagram of a computer system suitable for implementing an electronic device according to one or more embodiments of the present disclosure.

FIG. 2 shows a schematic structural diagram of a computer system suitable for implementing an electronic device according to some embodiments of the present disclosure.

It should be noted that the computer system 200 of the electronic device shown in FIG. 2 is only an example, and should not impose any limitations on the functions and scope of use of the embodiments of the present disclosure.

As shown in FIG. 2, the computer system 200 includes a central processing unit (CPU) 201, which can execute various appropriate operations and processes according to a program stored in a Read-Only Memory (ROM) 202 or a program loaded from a storage part 208 into a Random Access Memory (RAM) 203. In RAM 203, various programs and data necessary for system operation are also stored. CPU 201, ROM 202, and RAM 203 are connected to each other through a bus 204. An input/output (I/O) interface 205 is also connected to the bus 204.

The following components are connected to the I/O interface 205: an input part 206 including a keyboard, a mouse, etc.; an output part 207 including a cathode ray tube (CRT), a liquid crystal display (LCD), etc., and a speaker, etc.; a storage part 208 including a hard disk and the like; and a communication part 209 including a network interface card such as a LAN (Local Area Network) card, a modem, and the like. The communication part 209 performs communication processing via a network such as the Internet. A drive 210 is also connected to the I/O interface 205 as needed. A removable medium 211, such as a magnetic disk, an optical disk, a magneto-optical disk, a semiconductor memory, etc., is mounted on the drive 210 as needed so that a computer program read therefrom is installed into the storage part 208 as needed.

According to one or more embodiments of the present disclosure, the processes described below with reference to the flowcharts may be implemented as computer software programs. For example, one or more embodiments of the present disclosure include a computer program product comprising a computer program carried on a computer-readable storage medium, and the computer program contains program code for performing the method illustrated in the flowchart. In such embodiments, the computer program may be downloaded and installed from the network through the communication part 209 and/or installed from the removable medium 211. When the computer program is executed by the central processing unit (CPU) 201, various functions defined in the method and/or apparatus of the present application are performed.

It should be noted that the computer-readable storage medium shown in the present disclosure may be a computer-readable signal medium or a computer-readable storage medium, or any combination of the above two. The computer-readable storage medium can be, for example, but not limited to, an electrical, magnetic, optical, electromagnetic, infrared, or semiconductor system, apparatus or device, or a combination of any of the above. More specific examples of computer readable storage media may include, but are not limited to, electrical connections with one or more wires, portable computer disks, hard disks, random access memory (RAM), read only memory (ROM), erasable programmable read only memory (EPROM or flash memory), optical fiber, portable compact disk read only memory (CD-ROM), optical storage device, magnetic storage device, or any suitable combination of the above. In this disclosure, a computer-readable storage medium may be any tangible medium that contains or stores a program, and the program can be used by or in conjunction with an instruction execution system, apparatus, or device. In the present disclosure, however, a computer-readable signal medium may include a data signal propagated in baseband or as part of a carrier wave, and the data signal carries computer-readable program code therein. Such propagated data signal may take a variety of forms, including but not limited to electromagnetic signals, optical signals, or any suitable combination of the foregoing. A computer-readable signal medium can also be any computer-readable storage medium other than a computer-readable storage medium that can send, propagate, or transmit a program for use by or in connection with the instruction execution system, apparatus, or device. The program code contained on the computer-readable storage medium can be transmitted by any suitable medium, including but not limited to: wireless, wire, optical cable, RF (Radio Frequency, radio frequency), etc., or any suitable combination of the above.

The flowchart and block diagrams in the Figures illustrate the architecture, functionality, and operation of possible implementations of methods, apparatus and computer program products according to various embodiments of the present disclosure. In this regard, each block in the flowchart or block diagrams may represent a module, segment, or portion of code that contains one or more executable instructions for implementing specified logical functions. It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It is also noted that each block of the block diagrams or flowchart, and combinations of blocks in the block diagrams or flowchart, can be implemented by a dedicated hardware-based system that perform the specified functions or operations, or can be implemented by using a combination of dedicated hardware and computer instructions.

The modules and/or units and/or sub-units described in the embodiments of the present disclosure may be implemented by software or hardware. The described modules and/or units and/or sub-units can also be set in the processor. The names of these modules and/or units and/or sub-units do not constitute limitations on the modules and/or units and/or sub-units themselves under certain circumstances.

According to another aspect of the present disclosure, a computer-readable storage medium is provided. The computer-readable storage medium may be included in the electronic device described in the above embodiments, or may exist alone without being included in the electronic device. The above-mentioned computer-readable storage medium carries one or more programs, and when the above-mentioned one or more programs are executed by an electronic device, the electronic device is made to implement the methods described in the following embodiments. For example, the electronic device can implement the various steps shown in FIG. 5 or FIG. 6.

In related art, for example, machine learning methods, deep learning methods, etc. can be used to optimize the path of the unmanned vehicle, and different methods are applicable to different scopes.

Figure 3:
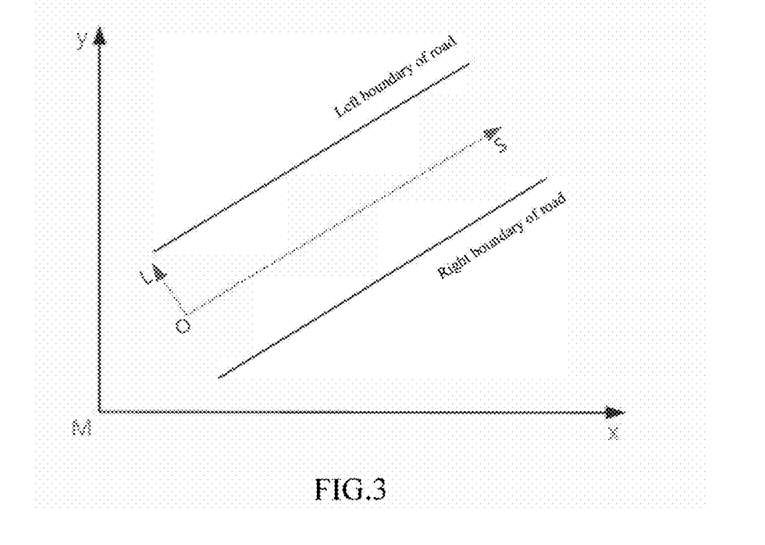
FIG. 3 schematically shows a Frenet coordinate system and a Cartesian coordinate system according to an embodiment of the present disclosure.

FIG. 3 schematically shows a Frenet coordinate system and a Cartesian coordinate system according to an embodiment of the present disclosure.

Referring to FIG. 3, the Cartesian coordinate system is the yMx coordinate system. The Frenet coordinate system takes the road centerline as the S axis and takes a leftward axis vertical to S axis as the L axis. The road centerline is composed of a series of discrete points. Assuming there is a point $p(x_p, y_p)$ in the Cartesian coordinate system, find two discrete points $s(x_s, y_s)$ and $e(x_e, y_e)$ closest to p in the road centerline. Assuming that the coordinates of s in the Frenet coordinate system are $(s_s, 0)$, and the coordinates of e in Frenet are $(s_e, 0)$, then the relationship between the point $p(x_p, y_p)$ in Cartesian coordinates and its coordinates $(s_p, l_p)$ in the Frenet coordinate system is determined by the formula (1):

$$\vec{a} = (x_p - x_s, y_p - y_s)$$

$$\vec{b} = (x_e - x_s, y_e - y_s)$$

$$\delta = \frac{\vec{a} \cdot \vec{b}}{|\vec{b}|}$$

$$s_p = s_s + \lambda(s_e - s_s)$$

(1)

$$l_p = \frac{\vec{b} \times \vec{a}}{|\vec{b}|}$$

Figure 4:
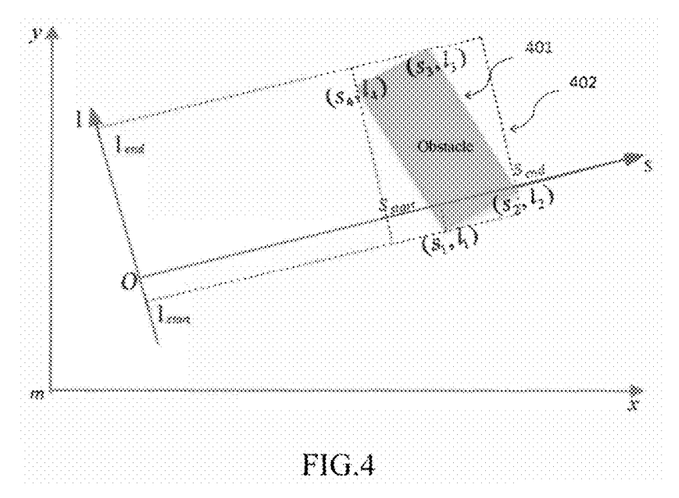
FIG. 4 schematically shows a schematic diagram of an obstacle and an obstacle boundary polygon in a Frenet coordinate system and a Cartesian coordinate system according to an embodiment of the present disclosure.

FIG. 4 schematically shows a schematic diagram of an obstacle 401 and an obstacle boundary polygon 402 in a Frenet coordinate system and a Cartesian coordinate system according to an embodiment of the present disclosure.

Referring to FIG. 4, a solid line polygon 401 is a schematic diagram of an obstacle, and a dotted line polygon 402 is a schematic diagram of an obstacle boundary polygon. In FIG. 4, the obstacle 401 and the obstacle boundary polygon 402 are both quadrilaterals, but the present disclosure is not limited thereto, and the obstacle and the obstacle boundary polygon may also be other shapes than quadrilaterals.

Among them, the path of the unmanned vehicle is a set of discrete points. No matter whether it is based on the Frenet coordinate system or the Cartesian coordinate system, the path planned by the unmanned vehicle can be expressed by a set of points $N=\{p_i(x_i,y_i,\theta_i,s_i,l_i)|i=1,2,\ldots,m\}$, where m represents the number of discrete points in the path, $(x_i,y_i,\theta_i)$ represents the Cartesian coordinates of the i-th point, $(s_i,l_i)$ represents the coordinates of the i-th point under Frenet.

Referring to FIG. 4, the obstacle polygon 402 is formed by a series of vertices connected in a certain order. Combined with the transformation relationship between the Frenet coordinate system and the Cartesian coordinate system, assuming that the obstacle boundary polygon 402 is represented by $(s_{start}, s_{end}, l_{start}, l_{end})$, then the boundary value of the obstacle boundary polygon can be determined according to formula (2):

$$s_{start} = \min(s_i)$$

$$l_{start} = \min(l_i)$$

$$s_{end} = \max(s_i)$$

$$l_{end} = \max(l_i)$$

(2)

Among them, $(s_i, l_i)$ in formula (2) represents the coordinates of the i-th point in the obstacle vertexes in the Frenet coordinate system.

Figure 5:
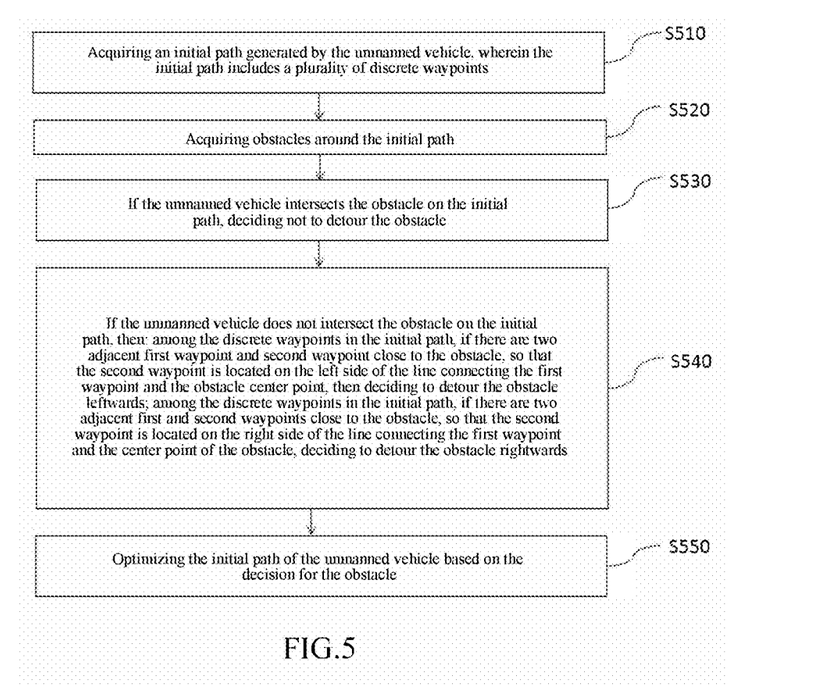
FIG. 5 schematically shows a flow chart of a method for optimizing a path of an unmanned vehicle according to an embodiment of the present disclosure.

FIG. 5 schematically shows a flowchart of a method for optimizing a path of an unmanned vehicle according to an embodiment of the present disclosure. The steps of the method according to the embodiments of the present disclosure may be performed by a terminal device, a server, or interactively performed by a terminal device and a server. For example, the method may be performed by the server 105 in FIG. 1, but the present disclosure is not limited thereto.

In step S510, acquiring an initial path generated by the unmanned vehicle, wherein the initial path includes a plurality of discrete waypoints.

In this step, the terminal device or server can acquire the initial path generated by the unmanned vehicle, wherein the initial path includes a plurality of discrete waypoints, that is, the initial path is composed of a plurality of discrete waypoints. For example, a plurality of discrete waypoints may be represented by a set of points $N=\{p_i(x_i,y_i,\theta_i,s_i,l_i)|i=1,2,\ldots,m\}$, where m represents the number of discrete points in the path, and $(x_i,y_i,\theta_i)$ represents the Cartesian coordinates of the i-th point, $(s_i,l_i)$ represents the coordinates of the i-th point under Frenet.

In the embodiments of the present disclosure, the terminal device may be implemented in various forms. For example, the terminals described in this disclosure may include mobile terminal such as mobile phone, tablet computer, notebook computer, PDA, personal digital assistants (PDA), portable media player (PMP), path optimization device for unmanned vehicle, wearable device, smart bracelet, pedometer, robot, and unmanned vehicle, as well as fixed terminal such as digital TV (television) and desktop computer.

In step S520, acquiring obstacle information around the initial path.

In this step, the terminal device or the server can acquire obstacle information around the initial path. In one embodiment, the obstacle information includes an obstacle boundary polygon. The obstacle boundary polygon includes a starting Frenet S coordinate and an ending Frenet S coordinate. The starting Frenet S coordinate of the obstacle can be the starting Frenet S coordinate of the obstacle boundary polygon, and the ending Frenet S coordinate of the obstacle can be the ending Frenet S coordinate of the obstacle boundary polygon. The initial path includes the starting Frenet S coordinate and the ending Frenet S coordinate. Acquiring the obstacles around the initial path includes: comparing the starting Frenet S coordinate and the ending Frenet S coordinate of the obstacle boundary polygon with the starting Frenet S coordinate and the ending Frenet S coordinate of the initial path; obtaining obstacle or obstacle boundary polygon, wherein the ending Frenet S coordinate of the obstacle boundary polygon is greater than the starting Frenet S coordinate of the initial path, and the starting Frenet S coordinate of the obstacle boundary polygon is smaller than the ending Frenet S coordinate of the initial path, that is, obtaining obstacle or obstacle boundary polygon located between the starting point and the ending point of the initial path.

In step S530, if the unmanned vehicle intersects the obstacle on the initial path, deciding not to detour the obstacle. For example, deciding not to detour the obstacle includes deciding not to move and waiting for further instruction.

In this step, the terminal device or the server determines: if the unmanned vehicle intersects the obstacle on the initial path, the decision for the obstacle is not to detour. For example, the terminal device or the server determines: if the unmanned vehicle intersects the obstacle on the initial path, the decision for the obstacle is not to to move and wait for further instruction.

In one embodiment, the unmanned vehicle has a center point, and the initial path is a moving trajectory of the center point of the unmanned vehicle during the driving process of the unmanned vehicle, wherein if the unmanned vehicle intersecting the obstacle on the initial path, deciding not to move includes: when the center point of the unmanned vehicle coincides with one discrete waypoint among the plurality of discrete waypoints and the unmanned vehicle intersects the obstacle, deciding not to move.

In one embodiment, the unmanned vehicle has a center point, and the initial path is a moving trajectory of the center point of the unmanned vehicle during the driving process of the unmanned vehicle, wherein if the unmanned vehicle intersecting the obstacle on the initial path, deciding not to move includes: when the center point of the unmanned vehicle is between two adjacent discrete waypoints on the initial path and the unmanned vehicle intersects the obstacle, deciding not to move.

In one embodiment, the center point of the unmanned vehicle being between two adjacent discrete waypoints on the initial path, includes: the intermediate trajectory point of the center points of the unmanned vehicles being inserted between two adjacent discrete waypoints of the initial path according to the moving trajectory of the unmanned vehicle, the center point of the unmanned vehicle can move along the intermediate trajectory point between two adjacent discrete waypoints.

The center point of the unmanned vehicle may be midpoint of the rear axle of the unmanned vehicle. The center point of the unmanned vehicle may be the geometric center point of the unmanned vehicle. The center point of the unmanned vehicle may be the center of gravity of the unmanned vehicle. The center point of the unmanned vehicle may also be the center of the bounding polygon of the unmanned vehicle. The present disclosure is not limited to this.

The method for acquiring the bounding polygon of the unmanned vehicle is similar to the method for acquiring the bounding polygon of the obstacle, and will not be described in detail here.

In one embodiment, the unmanned vehicle intersecting the obstacle on the initial path includes: the bounding polygon of the unmanned vehicle intersecting the obstacle on the initial path.

The unmanned vehicle not intersecting the obstacle on the initial path includes: the boundary polygon of the unmanned vehicle not intersecting the obstacle on the initial path.

In one embodiment, the unmanned vehicle intersecting the obstacle on the initial path comprises: the outline of the unmanned vehicle intersecting the obstacle on the initial path.

The unmanned vehicle not intersecting the obstacle on the initial path includes: the outline of the unmanned vehicle not intersecting the obstacle on the initial path.

In one embodiment, the obstacle comprises an obstacle boundary polygon, wherein if the unmanned vehicle intersecting the obstacle on the initial path includes: if the unmanned vehicle intersecting the obstacle or the obstacle boundary polygon on the initial path.

In one embodiment, if the unmanned vehicle intersecting the obstacle or the obstacle boundary polygon on the initial path, includes: among the discrete waypoints in the initial path, if there is a discrete waypoint so that the unmanned vehicle intersects the obstacle or the obstacle boundary polygon.

In one embodiment, the obstacle includes an obstacle boundary polygon. The obstacle boundary polygon includes a starting Frenet S coordinate and an ending Frenet S coordinate. The starting Frenet of the obstacle boundary polygon is the minimum value of the Frenet S coordinates among the endpoint coordinates of the obstacle boundary polygon, and the ending Frenet S coordinate of the obstacle-bounding polygon is the maximum value of the Frenet S coordinates among the endpoint coordinates of the obstacle boundary polygon. If there are two adjacent first and second waypoints close to the obstacle, it includes: if the Frenet S coordinate of the second waypoint is greater than the starting Frenet S coordinate of the obstacle boundary polygon and the Frenet S coordinate of the first waypoint is smaller than the ending Frenet S coordinate of the obstacle boundary polygon, there are two adjacent first waypoint and second waypoint close to the obstacle.

In step S540, if the unmanned vehicle does not intersect the obstacle on the initial path, deciding to move according to the initial path. Deciding to move according to the initial path includes: among the discrete waypoints in the initial path, if there are two adjacent first waypoint and second waypoint close to the obstacle, so that the second waypoint is located on the left side of the line connecting the first waypoint and the obstacle center point, then deciding to detour the obstacle leftwards; among the discrete waypoints in the initial path, if there are two adjacent first and second waypoints close to the obstacle, so that the second waypoint is located on the right side of the line connecting the first waypoint and the center point of the obstacle, deciding to detour the obstacle rightwards.

In this step, if the unmanned vehicle does not intersect the obstacle on the initial path, the terminal device or the server judges the decision for the obstacle according to the discrete waypoints in the initial path. In one embodiment, the center point of the obstacle may be the center point of the obstacle or the center point of the obstacle boundary polygon. Making the second waypoint located on the left side of the line connecting the first path and the center point of the obstacle includes: making the second waypoint located on the left side of the line connecting the first waypoint and the center point of the obstacle or the center point of the obstacle boundary polygon. Making the second waypoint be located on the right side of the line connecting the first waypoint and the center point of the obstacle includes: making the second waypoint be located on the right side of the line connecting the first waypoint and the center point of the obstacle or the center point of the obstacle boundary polygon. In one embodiment, the center point of the obstacle may be the geometric center of gravity point of the obstacle or the obstacle boundary polygon.

In one embodiment, a first vector connecting the first waypoint and the center point of the obstacle and a second vector connecting the first waypoint and the second vector are determined according to the Cartesian coordinates of the first waypoint, the second waypoint and the center point of the obstacle; wherein, in the discrete waypoints in the initial path, if there are two adjacent first and second waypoints close to the obstacle, so that the second waypoint is located on the left side of the line connecting the first waypoint and the center point of the obstacle, then the decision for the obstacle to detour left, includes: when the value of the cross product of the first vector and the second vector is greater than zero, the second waypoint is located on the left side of the line connecting the first waypoint and the center point of the obstacle, and the decision on the obstacle is to detour left; wherein, in the discrete waypoints in the initial path, if there are two adjacent first and second waypoints close to the obstacle, so that the second waypoint is located on the right side of the line connecting the first waypoint and the center point of the obstacle, then the decision for the obstacle to detour right, includes: when the value of the cross product of the first vector and the second vector is less than zero, the second waypoint is located on the right side of the line connecting the first waypoint and the center point of the obstacle, and the decision for the obstacle is to detour right.

In step S550, optimizing the initial path of the unmanned vehicle based on the decision for the obstacle.

In this step, the terminal device or the server can use the decision for the obstacle (no detour, detour left or detour right) obtained in the preceding steps for further optimization such as smoothing of the initial path, or for speed plan of the initial path, etc. Among them, in the further smooth optimization of the initial path, it is first necessary to finely solve the solution space required by the optimizer according to the decision information of the existing obstacles around the unmanned vehicle, the driving direction of the vehicle and the road boundary information, and then take the initial path as the initial value in the solution space, and optimize the path by IPOPT, OSQP and other optimizers, in order to obtain a smooth, comfortable, safe and feasible new path.

In the above-mentioned method for optimizing a path of an unmanned vehicle of the present disclosure, a decision-making method for obstacle around the initial path is obtained according to the initial path generated by the unmanned vehicle, which can avoid the problem of not being able to detour around the obstacle caused by inconsistent detour behaviors for the obstacle. The path after smoothing the inital path may have inconsistent detour behavior for the obstacle compared to the path before smoothing.

Figure 6:
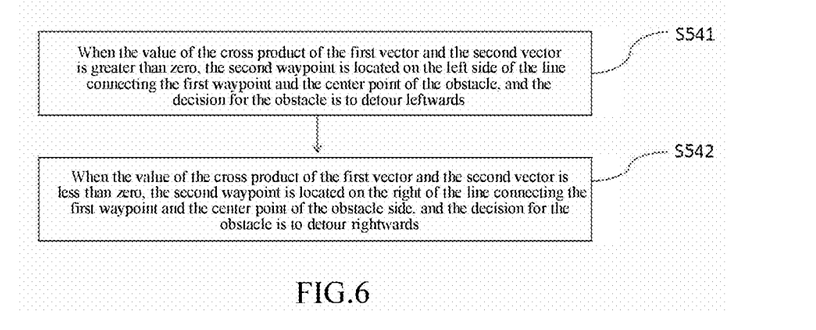
FIG. 6 schematically shows a flowchart of a method for decision-making on an obstacle of an unmanned vehicle according to an embodiment of the present disclosure.

FIG. 6 schematically shows a flowchart of a method for decision-making on an obstacle of an unmanned vehicle according to an embodiment of the present disclosure.

In one embodiment, a first vector connecting the first waypoint and the center point of the obstacle and a second vector connecting the first waypoint and the second waypoint is determined according to the Cartesian coordinates of the first waypoint, the second waypoint and the center point of the obstacle.

In step S541, when the value of the cross product of the first vector and the second vector is greater than zero, the second waypoint is located on the left side of the line connecting the first waypoint and the center point of the obstacle, and the decision for the obstacle is to detour leftwards.

In this step, among the discrete waypoints in the initial path, if there are two adjacent first and second waypoints close to the obstacle, so that he value of the cross product of the first vector and the second vector is greater than zero, the second waypoint is located on the left side of the line connecting the first waypoint and the center point of the obstacle, and the decision for the obstacle is to detour left.

In step S542, when the value of the cross product of the first vector and the second vector is less than zero, the second waypoint is located on the right of the line connecting the first waypoint and the center point of the obstacle side, and the decision for the obstacle is to detour rightwards.

In this step, among the discrete waypoints in the initial path, if there are two adjacent first and second waypoints close to the obstacle, so that the value of the cross product of the first vector and the second vector is less than zero, the second waypoint is located on the right side of the line connecting the first waypoint and the center point of the obstacle, and the decision for the obstacle is to detour right.

In one embodiment, the process of the decision-making algorithm for nearby obstacles based on the generated initial path is as follows.

Traverse all obstacles $b_j$ from the perception module, and store all obstacles that do not satisfy the condition of $b_j \cdot s_{start} > s_m \| b_j \cdot s_{end} < s_1$ into the container $V = \{b_j | j=1, 2, \ldots, k\}$; wherein, $b_j \cdot s_{start} > s_m \| b_j \cdot s_{end} < s_1$ indicates all obstacles of which the ending Frenet S coordinate is smaller than the starting Frenet S coordinate of the initial path or the starting Frenet S coordinate is greater than the ending Frenet S coordinate of the initial path.

Traverse all obstacles $b_j$ in container V:
  Initialize the bool (Boolean) type flag bit flag=false, set the $b_j$ default detour status flag direction=left, that is, detour left;
  Traverse all waypoints $p_i$:
    If $s_{i+1} < b_j \cdot s_{start}$, continue; if $s_i > b_j \cdot s_{end}$, break; where, $s_{i+1} < b_j \cdot s_{start}$ indicates that the Frenet S coordinate of the waypoint of the initial path is smaller than the the starting Frenet S coordinate of the obstacle; $s_i > b_j \cdot s_{end}$ indicates that the Frenet S coordinate of the waypoint of the initial path is greater than the ending Frenet S coordinate of the obstacle;

Let $p_{ixy}=(x_i,y_i,\theta_i,s_i)$, $p_{i+1xy}(x_{i+1},y_{i+1},\theta_{i+1},s_{i+1})$;

If the unmanned vehicle collides with a polygonal obstacle at a certain point within the interval $(s_i,s_{i+1})$ of the existing path s (that is, the unmanned vehicle intersects the obstacle or the obstacle boundary polygon within $(s_i,s_{i+1})$), then set direction=cross, that is, not detour, break; otherwise, if flag is false, take the center point $a(x_a,y_a)$ of the obstacle or the obstacle boundary polygon, and construct vector $\hat{m}=(x_a-x_i,y_a-y_i)$ (the first vector) and $\vec{n}=(x_{i+1}-x_i,y_{i+1}-y_i)$ (second vector). If $\vec{m}=\vec{n}>0$ is established, let direction=left, flag=true, otherwise, let direction=right, flag=true;

If the direction is left, the lateral decision for the obstacle $b_j$ is to detour left, and if the direction is right, the lateral decision for the obstacle $b_j$ is to detour right, otherwise not detour.

Figure 7:
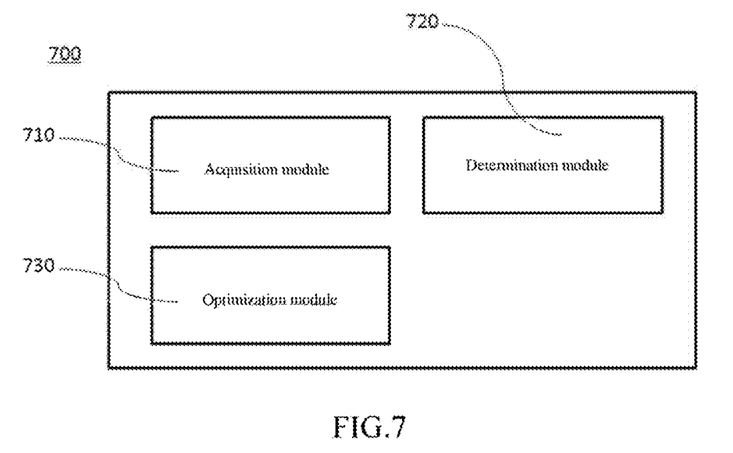
FIG. 7 schematically shows a block diagram of an apparatus for optimizing a path of an unmanned vehicle according to an embodiment of the present disclosure.

FIG. 7 schematically shows a block diagram of an apparatus for optimizing a path of an unmanned vehicle according to an embodiment of the present disclosure. The apparatus 700 according to the embodiment of the present disclosure may be set on the terminal device, and may also be set on the server side, or may be partially set on the terminal device and partially set on the server side. For example, it may be set on the server 105 in FIG. 1, but the present disclosure is not limited to this.

The apparatus 700 according to the embodiment of the present disclosure may include an acquisition module 710, a determination module 720 and an optimization module 730.

The acquisition module 710 is configured to acquire an initial path generated by the unmanned vehicle and obstacle around the initial path, wherein the initial path includes a plurality of discrete waypoints; the determination module 720 is configured to: if the unmanned vehicle intersects the obstacle on the initial path, decide not to detour for the obstacle, for example, decide not to move and wait for further instruction; and if the unmanned vehicle does not intersect the obstacle on the initial path, decide to move according to the initial path, and decide to move according to the initial path includes: among the discrete waypoints in the initial path, if there are two adjacent first waypoint and second waypoint close to the obstacle, so that the second waypoint is located on the left side of the line connecting the first waypoint and the center point of the obstacle, decide to detour the obstacle leftwards; in the discrete waypoints in the initial path, if there are two adjacent first waypoint the second waypoint close to the obstacle, so that the second waypoint is located on the right side of the line connecting the first waypoint and the center point of the obstacle, then decide to detour the obstacle rightwards; and the optimization module 730 is configured to optimize the initial path of the unmanned vehicle based on the decision of the obstacle.

The apparatus 700 can obtain a decision-making method for obstacles around the initial path according to the initial path generated by the unmanned vehicle, so as to avoid the problem of not being able to detour around the obstacle caused by inconsistent detour behaviors for the obstacle. The path after smoothing the inital path may have inconsistent detour behavior for the obstacle compared to the path before smoothing.

According to one or more embodiments of the present disclosure, the above-mentioned apparatus 700 can be used to implement the method for optimazing a path of an unmanned vehicle and the method for decision making on an obstacle of an unmanned vehicle described in the embodiments of FIG. 5 and FIG. 6.

Figure 8:
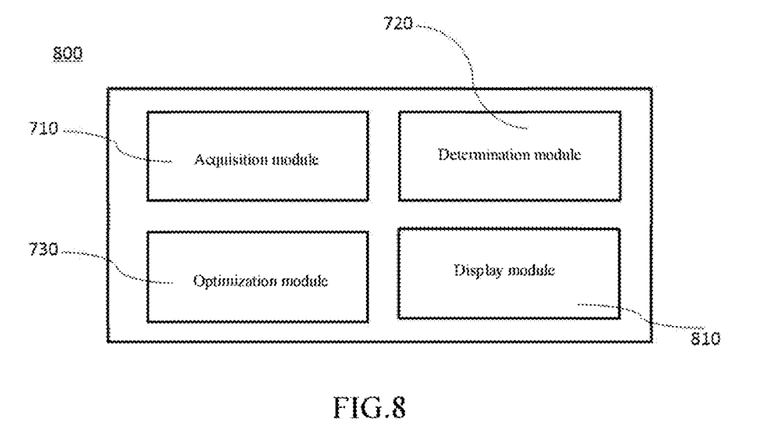
FIG. 8 schematically shows a block diagram of an apparatus for optimizing a path of an unmanned vehicle according to another embodiment of the present disclosure.

FIG. 8 schematically shows a block diagram of an apparatus 800 for optimizing a path of an unmanned vehicle according to another embodiment of the present disclosure.

As shown in FIG. 8, in addition to the acquisition module 710, the determination module 720, and the optimization module 730 described in the embodiment of FIG. 7, the apparatus 800 further includes a display module 810.

Specifically, the display module 810 displays the obstacle decision result and the path optimization result on the terminal after the determination module 720 makes a decision on the obstacle and after the optimization module 730 optimizes the initial path.

In the apparatus 800, the display module 810 can achieve the visual display of the obstacle decision result and the path optimization result.

Figure 9:
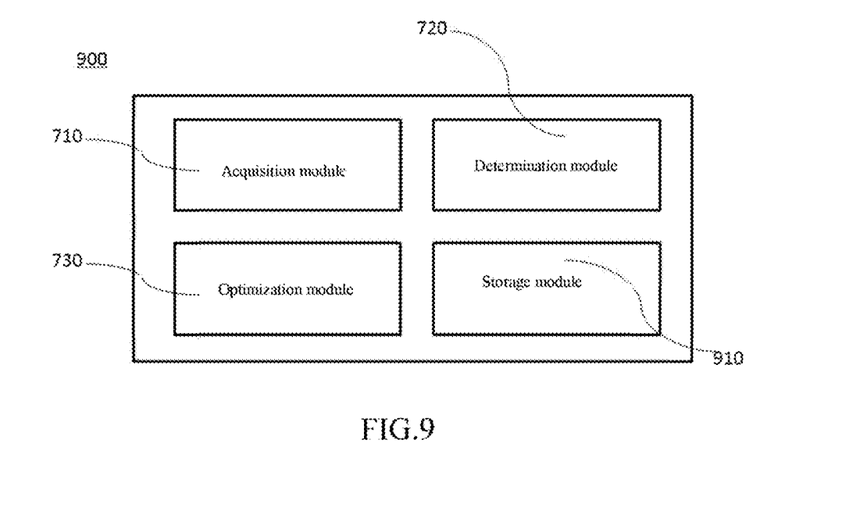
FIG. 9 schematically shows a block diagram of an apparatus for optimizing a path of an unmanned vehicle according to another embodiment of the present disclosure.

FIG. 9 schematically shows a block diagram of an apparatus 900 for optimizing a path of an unmanned vehicle according to another embodiment of the present disclosure.

As shown in FIG. 9, in addition to the acquisition module 710, the determination module 720, and the optimization module 730 described in the embodiment of FIG. 7, the apparatus 900 further includes a storage module 910.

Specifically, the storage module 910 is configured to store the obstacle decision result and the path optimization result, so as to facilitate subsequent invocation and reference.

It can be understood that the acquisition module 710, the judgment module 720, the optimization module 730, the display module 810 and the storage module 910 may be combined into one module, or any one of the modules may be split into multiple modules. Alternatively, at least part of the functionality of one or more of these modules may be combined with at least part of the functionality of other modules and implemented in one module. According to an embodiment of the present disclosure, at least one of the acquisition module 710, the determination module 720, the optimization module 730, the display module 810, and the storage module 910 may be at least partially implemented as a hardware circuit, such as a field programmable gate array (FPGA), a programmed logic array (PLA), system-on-chip, system-on-substrate, system-on-package, application-specific integrated circuit (ASIC), or implemented in hardware or firmware in any other reasonable manner that integrates or packages circuits, or it is implemented in an appropriate combination of software, hardware and firmware implementations. Alternatively, at least one of the acquisition module 710, the determination module 720, the optimization module 730, the display module 810, and the storage module 910 may be implemented at least partially as a computer program module, and when the program is run by a computer, the functions of the corresponding modules may be executed.

Since each module of the apparatus for optimizing the path of the unmanned vehicle of the exemplary embodiment of the present disclosure can be used to implement the steps of the exemplary implementation of the method for optimizing the path of the unmanned vehicle described in the above-mentioned FIG. 5 and FIG. 6, for undisclosed details, please refer to the above-mentioned embodiments of the method for optimizing the path of the unmanned vehicle in the present disclosure.

For the specific implementation of each module, unit, and sub-unit in the apparatus for optimizing the path of the unmanned vehicle according to the embodiments of the present disclosure, reference may be made to the content in the method for for optimizing the path of the unmanned vehicle, which will not be repeated here.

It should be noted that although several modules, units and sub-units of the apparatus for action performance are mentioned in the above detailed description, this division is not mandatory. Indeed, according to embodiments of the present disclosure, the features and functions of two or more modules, units and sub-units described above may be embodied in one module, unit and sub-unit. Conversely, the features and functions of one module, unit and sub-unit described above may be further divided to be embodied by a plurality of modules, units and sub-units.

From the description of the above embodiments, those skilled in the art can easily understand that the exemplary embodiments described herein may be implemented by software, or may be implemented by software combined with necessary hardware. Therefore, the technical solutions according to the embodiments of the present disclosure may be embodied in the form of software products, and the software products may be stored in a non-volatile storage medium (which may be CD-ROM, U disk, mobile hard disk, etc.) or on the network, which includes several instructions to cause a computing device (which may be a personal computer, a server, a touch terminal, or a network device, etc.) to execute the method according to an embodiment of the present disclosure.

Other embodiments of the present disclosure will readily occur to those skilled in the art upon consideration of the specification and practice of the disclosure disclosed herein. This application is intended to cover any variations, uses, or adaptations of the present disclosure that follow the general principles of the present disclosure and include common knowledge or techniques in the technical field not disclosed by the present disclosure. The specification and embodiments are to be regarded as exemplary only, with the true scope and spirit of the disclosure being indicated by the following claims.

It is to be understood that the present disclosure is not limited to the precise structures described above and illustrated in the accompanying drawings, and that various modifications and changes may be made without departing from the scope thereof. The scope of the present disclosure is limited only by the appended claims.

What is claimed is:

1. A method for optimizing a path of an unmanned vehicle, comprising:
   the unmanned vehicle sending a request in a form of a message via a network to a server to optimize a path and the server acquiring an initial path generated by the unmanned vehicle, wherein the initial path includes a plurality of discrete waypoints;
   acquiring, by one or more sensors, obstacle information around the initial path;
   in response to the unmanned vehicle intersecting the obstacle on the initial path, deciding not to move;
   in response to the unmanned vehicle not intersecting the obstacle on the initial path, deciding to move according to the initial path,
   wherein said deciding to move according to the initial path comprises:
     among the discrete waypoints in the initial path, in response to that there are two adjacent first waypoint and second waypoint close to the obstacle, and the second waypoint is located on a left side of a line connecting the first waypoint and a center point of the obstacle, deciding to detour the obstacle leftwards;
     among the discrete waypoints in the initial path, in response to that there are two adjacent first and second waypoints close to the obstacle, and the second waypoint is located on a right side of a line connecting the first waypoint and the center point of the obstacle, deciding to detour the obstacle rightwards; and
   optimizing, by a program, the initial path of the unmanned vehicle based on the deciding for the obstacle.

2. The method according to claim 1, wherein the unmanned vehicle has a center point, and the initial path is a movement trajectory of the center point of the unmanned vehicle during a driving process of the unmanned vehicle, wherein said in response to the unmanned vehicle intersecting the obstacle on the initial path, deciding not to move, comprises:
   in response to the center point of the unmanned vehicle coinciding with one discrete waypoint among the plurality of discrete waypoints, and the unmanned vehicle intersecting the obstacle, deciding not to move.

3. The method according to claim 1, wherein the unmanned vehicle has a center point, and the initial path is a movement trajectory of the center point of the unmanned vehicle during a driving process of the unmanned vehicle, wherein said in response to the unmanned vehicle intersecting the obstacle on the initial path, deciding not to move, comprises:
   in response to the center point of the unmanned vehicle being between two adjacent discrete waypoints of the initial path, and the unmanned vehicle intersecting the obstacle, deciding not to move.

4. The method according to claim 3, wherein said the center point of the unmanned vehicle being between two adjacent discrete waypoints of the initial path, comprises:
   there are a plurality of intermediate trajectory points of the center points of the unmanned vehicles inserted according to the movement trajectory of the unmanned vehicle between the two adjacent discrete waypoints of the initial path, and the center point of the unmanned vehicle moves along the intermediate trajectory points between the two adjacent discrete waypoints.

5. The method according to claim 1, wherein the obstacle comprises an obstacle boundary polygon, the obstacle boundary polygon comprises a starting Frenet S coordinate and an ending Frenet S coordinate, the starting Frenet S coordinate of the obstacle boundary polygon is a minimum value of the Frenet S coordinates of endpoint coordinates of the obstacle boundary polygon, and the ending Frenet S coordinate of the obstacle boundary polygon is a maximum value of the Frenet S coordinates of the endpoint coordinates of the obstacle boundary polygon, wherein, the method further comprises:
   in response to that the Frenet S coordinate of the second waypoint is greater than the starting Frenet S coordinate of the obstacle and the Frenet S coordinate of the first waypoint is smaller than the ending Frenet S coordinate of the obstacle, determining that there are two adjacent first waypoint and second waypoint close to the obstacle.

6. The method according to claim 1, wherein the obstacle comprises an obstacle boundary polygon, wherein said the unmanned vehicle intersecting the obstacle on the initial path comprises:
   the unmanned vehicle intersecting the obstacle or the obstacle boundary polygon on the initial path.

7. The method according to claim 6, wherein said the unmanned vehicle intersecting the obstacle or the obstacle boundary polygon on the initial path comprises:

the unmanned vehicle intersecting the obstacle or the obstacle boundary polygon at one discrete waypoint among discrete waypoints in the initial path.

8. An electronic device, comprising:
one or more processors;
a memory configured to store one or more programs which, in response to being executed by the one or more processors, cause the one or more processors to implement the following steps:
an unmanned vehicle sending a request in a form of a message via a network to a server to optimize a path and the server acquiring an initial path generated by the unmanned vehicle, wherein the initial path includes a plurality of discrete waypoints;
acquiring, by one or more sensors, obstacle information around the initial path;
in response to the unmanned vehicle intersecting the obstacle on the initial path, deciding not to move;
in response to the unmanned vehicle not intersecting the obstacle on the initial path, deciding to move according to the initial path,
wherein said deciding to move according to the initial path comprises:
among discrete waypoints in the initial path, in response to that there are two adjacent first waypoint and second waypoint close to the obstacle, and the second waypoint is located on a left side of a line connecting the first waypoint and a center point of the obstacle, deciding to detour the obstacle leftwards;
among the discrete waypoints in the initial path, in response to that there are two adjacent first and second waypoints close to the obstacle, and the second waypoint is located on a right side of a line connecting the first waypoint and the center point of the obstacle, deciding to detour the obstacle rightwards; and
optimizing, by a program, the initial path of the unmanned vehicle based on the deciding for the obstacle.

9. A non-transitory computer-readable storage medium storing a computer program, wherein the following steps are implemented in response to the computer program being executed by a processor:
an unmanned vehicle sending a request in a form of a message via a network to a server to optimize a path and the server acquiring an initial path generated by the unmanned vehicle, wherein the initial path includes a plurality of discrete waypoints;
acquiring, by one or more sensors, obstacle information around the initial path;
in response to the unmanned vehicle intersecting the obstacle on the initial path, deciding not to move;
in response to the unmanned vehicle not intersecting the obstacle on the initial path, deciding to move according to the initial path,
wherein said deciding to move according to the initial path comprises:
among discrete waypoints in the initial path, in response to that there are two adjacent first waypoint and second waypoint close to the obstacle, and the second waypoint is located on a left side of a line connecting the first waypoint and a center point of the obstacle, deciding to detour the obstacle leftwards;
among the discrete waypoints in the initial path, in response to that there are two adjacent first and second waypoints close to the obstacle, and the second waypoint is located on a right side of a line connecting the first waypoint and the center point of the obstacle, deciding to detour the obstacle rightwards; and
optimizing, by a program, the initial path of the unmanned vehicle based on the deciding for the obstacle.

10. The device according to claim 8, wherein the unmanned vehicle has a center point, and the initial path is a movement trajectory of the center point of the unmanned vehicle during a driving process of the unmanned vehicle, wherein said in response to the unmanned vehicle intersecting the obstacle on the initial path, deciding not to move comprises:
in response to the center point of the unmanned vehicle coinciding with one discrete waypoint among the plurality of discrete waypoints and the unmanned vehicle intersecting the obstacle, deciding not to move.

11. The device according to claim 8, wherein the unmanned vehicle has a center point, and the initial path is a movement trajectory of the center point of the unmanned vehicle during a driving process of the unmanned vehicle, wherein said in response to the unmanned vehicle intersecting the obstacle on the initial path, deciding not to move comprises:
in response to the center point of the unmanned vehicle being between two adjacent discrete waypoints of the initial path and the unmanned vehicle intersecting the obstacle, deciding not to move.

12. The device according to claim 11, wherein said the center point of the unmanned vehicle being between two adjacent discrete waypoints of the initial path, comprises:
there are a plurality of intermediate trajectory points of the center points of the unmanned vehicles inserted according to the movement trajectory of the unmanned vehicle between the two adjacent discrete waypoints of the initial path, and the center point of the unmanned vehicle moves along the intermediate trajectory points between the two adjacent discrete waypoints.

13. The device according to claim 8, wherein the obstacle comprises an obstacle boundary polygon, the obstacle boundary polygon comprises a starting Frenet S coordinate and an ending Frenet S coordinate, the starting Frenet S coordinate of the obstacle boundary polygon is a minimum value of the Frenet S coordinates of endpoint coordinates of the obstacle boundary polygon, and the ending Frenet S coordinate of the obstacle boundary polygon is a maximum value of the Frenet S coordinates of the endpoint coordinates of the obstacle boundary polygon, wherein the processor is further caused to implement the following step:
in response to that the Frenet S coordinate of the second waypoint is greater than the starting Frenet S coordinate of the obstacle and the Frenet S coordinate of the first waypoint is smaller than the ending Frenet S coordinate of the obstacle, determining that there are two adjacent first waypoint and second waypoint close to the obstacle.

14. The device according to claim 8, wherein the obstacle comprises an obstacle boundary polygon, wherein said the unmanned vehicle intersecting the obstacle on the initial path comprises:
the unmanned vehicle intersecting the obstacle or the obstacle boundary polygon on the initial path.

15. The device according to claim 14, wherein said the unmanned vehicle intersecting the obstacle or the obstacle boundary polygon on the initial path comprises:

the unmanned vehicle intersecting the obstacle or the obstacle boundary polygon at one discrete waypoint among discrete waypoints in the initial path.

16. The non-transitory computer readable storage medium according to claim 9, wherein the unmanned vehicle has a center point, and the initial path is a movement trajectory of the center point of the unmanned vehicle during a driving process of the unmanned vehicle, wherein said in response to the unmanned vehicle intersecting the obstacle on the initial path, deciding not to move comprises:
in response to the center point of the unmanned vehicle coinciding with one discrete waypoint among the plurality of discrete waypoints and the unmanned vehicle intersecting the obstacle, deciding not to move.

17. The non-transitory computer readable storage medium according to claim 9, wherein the unmanned vehicle has a center point, and the initial path is a movement trajectory of the center point of the unmanned vehicle during a driving process of the unmanned vehicle, wherein said in response to the unmanned vehicle intersecting the obstacle on the initial path, deciding not to move comprises:
in response to the center point of the unmanned vehicle being between two adjacent discrete waypoints of the initial path and the unmanned vehicle intersecting the obstacle, deciding not to move.

18. The non-transitory computer readable storage medium according to claim 17, wherein said the center point of the unmanned vehicle being between two adjacent discrete waypoints of the initial path, comprises:
there are a plurality of intermediate trajectory points of the center points of the unmanned vehicles inserted according to the movement trajectory of the unmanned vehicle between the two adjacent discrete waypoints of the initial path, and the center point of the unmanned vehicle moves along the intermediate trajectory points between the two adjacent discrete waypoints.

19. The non-transitory computer readable storage medium according to claim 9, wherein the obstacle comprises an obstacle boundary polygon, the obstacle boundary polygon comprises a starting Frenet S coordinate and an ending Frenet S coordinate, the starting Frenet S coordinate of the obstacle boundary polygon is a minimum value of the Frenet S coordinates of endpoint coordinates of the obstacle boundary polygon, and the ending Frenet S coordinate of the obstacle boundary polygon is a maximum value of the Frenet S coordinates of the endpoint coordinates of the obstacle boundary polygon, wherein the following step is further implemented in response to the computer program being executed by a processor:
in response to that the Frenet S coordinate of the second waypoint is greater than the starting Frenet S coordinate of the obstacle and the Frenet S coordinate of the first waypoint is smaller than the ending Frenet S coordinate of the obstacle, determining that there are two adjacent first waypoint and second waypoint close to the obstacle.

20. The non-transitory computer readable storage medium according to claim 9, wherein the obstacle comprises an obstacle boundary polygon, wherein said the unmanned vehicle intersecting the obstacle on the initial path comprises:
the unmanned vehicle intersecting the obstacle or the obstacle boundary polygon on the initial path.

* * * * *